United States Patent
Hentrich et al.

[15] 3,700,037
[45] Oct. 24, 1972

[54] PLOW COLTER WITH YIELDABLE FORCE-APPLYING MEANS AND ADJUSTABLE OVERLOAD MOUNT FOR COLTER CARRYING ARM

[72] Inventors: Robert Dale Hentrich, Bettendorf, Iowa; Howard Christian Esbeck, Moline; Loren Glenn Arnold, Rock Island, both of Ill.

[73] Assignee: Deere & Company, Moline, Ill.

[22] Filed: Jan. 25, 1971

[21] Appl. No.: 109,304

[52] U.S. Cl. ............... 172/265, 172/270, 172/705
[51] Int. Cl. .......................................... A01b 61/04
[58] Field of Search ............ 172/139, 165, 166, 264, 172/265–266, 261, 271, 572, 705, 710, 270

[56] References Cited

UNITED STATES PATENTS

| 3,642,073 | 2/1972 | Geurts | 172/180 |
| 1,260,076 | 3/1918 | Sherwin | 172/572 |
| 3,529,676 | 9/1970 | Moe et al | 172/572 |
| 3,405,767 | 10/1968 | Thompson | 172/572 |
| 1,443,171 | 1/1923 | Dupler | 172/271 |
| 3,561,541 | 2/1971 | Woelfel | 172/265 |
| 3,451,489 | 6/1969 | Sullivan | 172/264 |
| 3,545,550 | 12/1970 | Wenzel | 172/572 |
| 175,251 | 3/1876 | Miller | 172/270 |
| 252,279 | 1/1882 | Van Brunt | 172/270 |
| 437,651 | 9/1890 | Jones | 172/705 |

Primary Examiner—Robert E. Pulfrey
Assistant Examiner—C. W. Hanor
Attorney—H. Vincent Harsha, Raymond L. Hollister, Harold M. Knoth, William A. Murray, James M. Nolan and John O. Hayes

[57] ABSTRACT

A colter arm having a colter on its rear end is connected to a rockshaft on a mounting bracket and is normally held in a working position by either a spring or a hydraulic cylinder acting between the mounting bracket and a lever arm on the rockshaft so that if the colter encounters an obstruction the spring or hydraulic cylinder will yield to permit the colter to move over the obstruction. The colter arm and one end of the rockshaft have complementary serrated faces which are clamped together to normally hold the colter arm and rockshaft in fixed relative positions. By loosening the bolt clamping the faces together the relative position of the colter arm with respect to the rockshaft can be varied, and, if the colter encounters an extra large obstruction, the bolt will stretch and permit the teeth of the serrated faces to slip and thereby prevent damage to the colter.

8 Claims, 5 Drawing Figures

PATENTED OCT 24 1972 3,700,037

INVENTORS
R. D. HENTRICH
H. C. ESBECK
L. G. ARNOLD

INVENTORS
R. D. HENTRICH
H. C. ESBECK
L. G. ARNOLD 3,700,037

PLOW COLTER WITH YIELDABLE FORCE-APPLYING MEANS AND ADJUSTABLE OVERLOAD MOUNT FOR COLTER CARRYING ARM

BACKGROUND OF THE INVENTION

The present invention relates generally to earth-working tools, and specifically relates to a mounting for plow colters.

The use of colters on moldboard plows to cut trash in front of the leading edges of the bottoms has long been known. As safety trip and cushion standards were developed for the bottoms of moldboard plows, there were also proposals for cushion colters or colters that would yield upwardly when an obstruction was encountered. One such cushion colter is illustrated in U. S. Pat. No. 3,451,489 which issued to J. F. Sullivan on 24 June 1969. However, all the previous colter mounting designs failed to provide an easy means of adjusting the working depth of the colter and had only limited clearance when tripped.

SUMMARY OF THE INVENTION

The primary objection of the present invention is to provide a colter mounting which permits the colter to pass over obstructions, such as rocks, without damage to the colter or plow and yet provides a sufficient force on the colter to effectively cut through trash.

Another object of the present invention is to provide a cushion mounting for colters which can use either spring cushion or a hydraulic cushion by changing a few parts.

Still another object of the invention is to provide a cushion mounting for a colter which includes an easy means of adjusting the working position of the colter.

A further object of the invention is to provide a cushion mounting for a colter which includes a toothed joint in which the teeth will slip to provide extra clearance when the colter encounters an extra large obstruction.

The above objects and additional objects and advantages will become apparent to those skilled in the art from a reading of the following detailed description of two preferred embodiments of the invention when taken in conjunction with the accompanying drawings.

DESCRIPTION OF THE PREFERRED EMBODIMENTS

Figure 1:
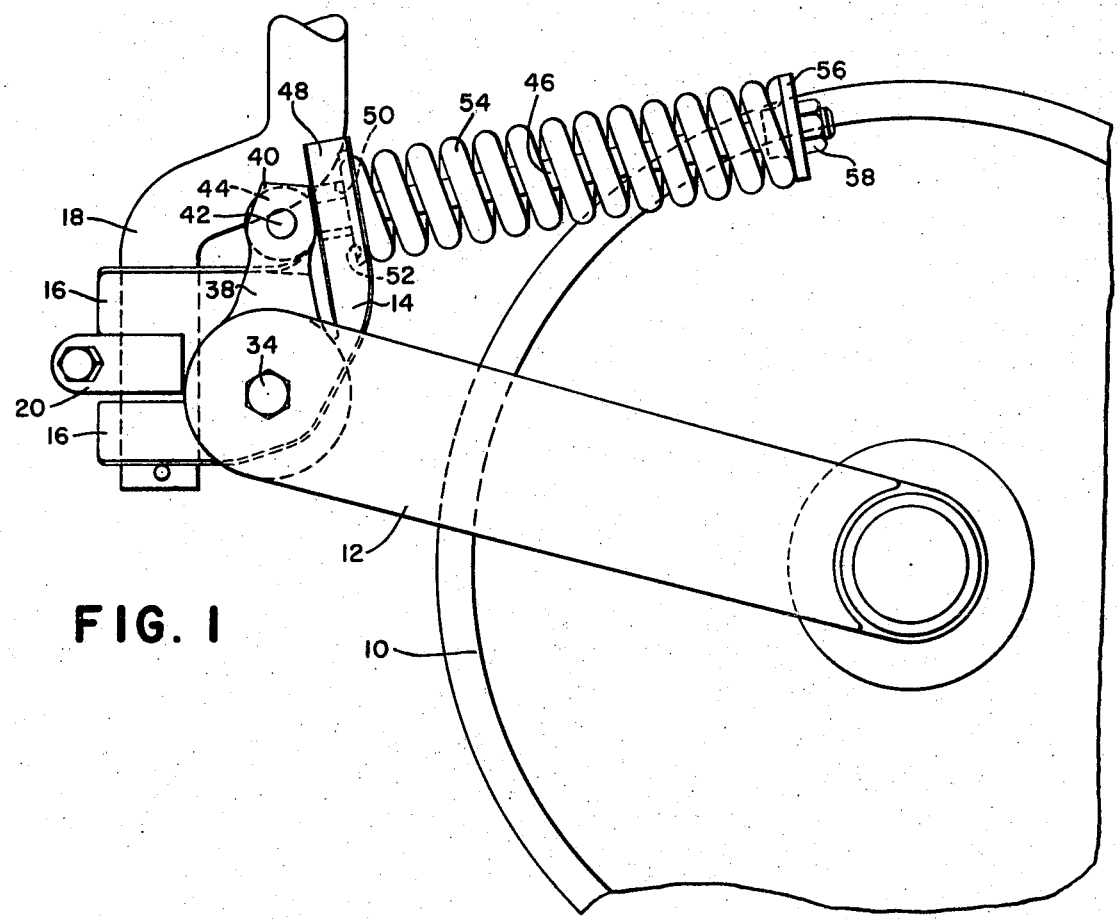
FIG. 1 is a side elevation view of a first embodiment of the invention.
Figure 2:
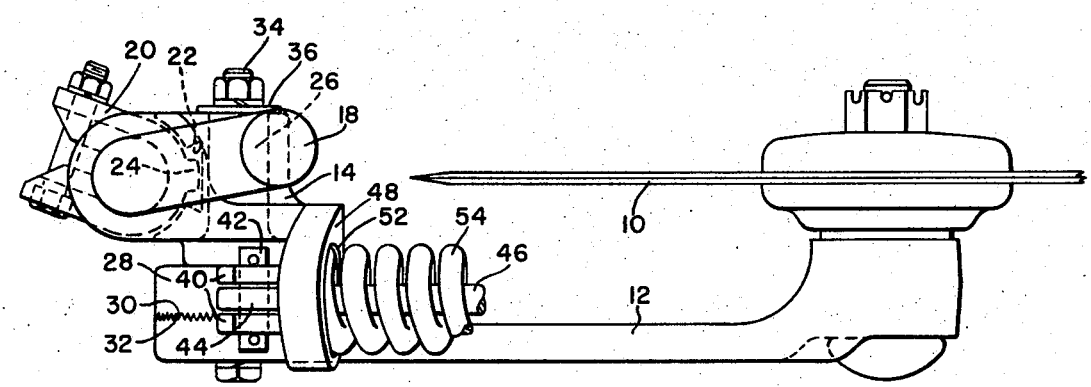
FIG. 2 is a top plan view of the first embodiment of the invention.

Referring now to the drawings, a first embodiment of the invention is illustrated in FIGS. 1 and 2 and includes a colter 10 rotatably mounted on the rear end of a colter arm 12. The forward end of the colter arm is pivotally connected to a mounting bracket 14. The mounting bracket 14 includes a pair of vertically spaced bearing blocks 16 which are rotatably mounted on the lower end of a shank 18. The upper end of the shank is adapted to be clamped to the frame of a plow so that the colter 10 runs in front of the leading edge of one of the bottoms. A clamp 20 is secured to the shank 18 between the vertically spaced bearing blocks 16 to vertically position the mounting bracket on the shank. The main body of the mounting bracket 14 is provided with a recessed area 22 between and rearwardly of the bearing blocks, and a lug 24 on the clamp 20 extends into the recessed area so that engagement between the sides of the recessed area and the lug limit rotational movement of the mounting bracket on the shank.

The bracket 14 is provided with a transverse bore in which a rockshaft 26 is rotatably mounted. The rockshaft 26 has an enlarged end 28 which engages the bracket 14 and prevents lateral movement of the rockshaft in one direction. The rockshaft has a through bore and the enlarged end 12 thereof is provided with a circular, laterally directed serrated face 30. The forward end of the colter arm has a centrally apertured and laterally directed circular serrated face 32 complementary to the serrated face on the rockshaft, and a bolt 34 extends through the aperture in the colter arm and through the bore in the rockshaft to clamp the serrated faces together and hold the rockshaft and colter arm in fixed relative positions. A washer 36 on the end of the bolt opposite from the colter arm has a diameter greater than the diameter of the bore in the bracket 14 and engages the bracket to prevent removal of the rockshaft 26.

Although the faces 30 and 32 on the enlarged end of the rockshaft and the forward end of the colter arm are illustrated and described as being serrated, those skilled in the art will realize that the same effect can be achieved by other structure. For example, the faces could be knurled. Therefore, the term serrated as used in the description and claims is intended as a generic description of the equivalent structures.

The enlarged end 28 of the rockshaft 26 has an integral, generally upwardly extending, lever arm 38 which is forked at its upper end to provide a pair of spaced anchor ears 40. The ears 40 are apertured to receive an anchor pin 42 which also extends through an eye 44 on the forward end of a tension link 46. The eye 44 is positioned between the ears 40. A laterally projecting spring abutment 48 on the bracket 14 extends to a position to the rear of the lever arm 38 and is provided with an aperture 50 through which the tension link 46 extends. The spring abutment is also provided with a rearwardly facing circular recess 52 which is centered on the aperture 50 and provides a seat for the forward end of a coil spring 54 which encircles the tension link 46. A spring retainer 56 bears against the rear end of the spring 54 and is retained on the tension link 46 by a nut 58.

The spring 54, acting through the tension link 46, normally retains the lever arm 38 in a rearward position against the spring abutment which also acts as a stop means and thus retains the rear end of the colter arm in a lowered, normal working position. However, should the colter 10 encounter an obstruction, the spring 54 will yield and permit the colter to move upwardly and over the obstruction.

The serrated faces on the rockshaft and the forward end of the colter arm provide a simple adjustment for the colter. By simply loosening the bolt 34, the colter arm can be pivoted about the bolt 34 relative to the rockshaft to change the normal working position of the colter with respect to the bracket without affecting the tension of the spring 54.

The serrated faces on the rockshaft and the forward end of the colter arm also provide a safety feature which prevents damage to the colter. If the colter encounters an extra large obstruction which requires more clearance than can be provided by the spring 54, an obstruction which the colter cannot pass over when the spring 54 is fully compressed, the bolt 34 will stretch and permit the teeth of the serrated faces 30 and 32 to slip so that the colter can move upwardly the distance required to clear the obstruction.

Figure 3:
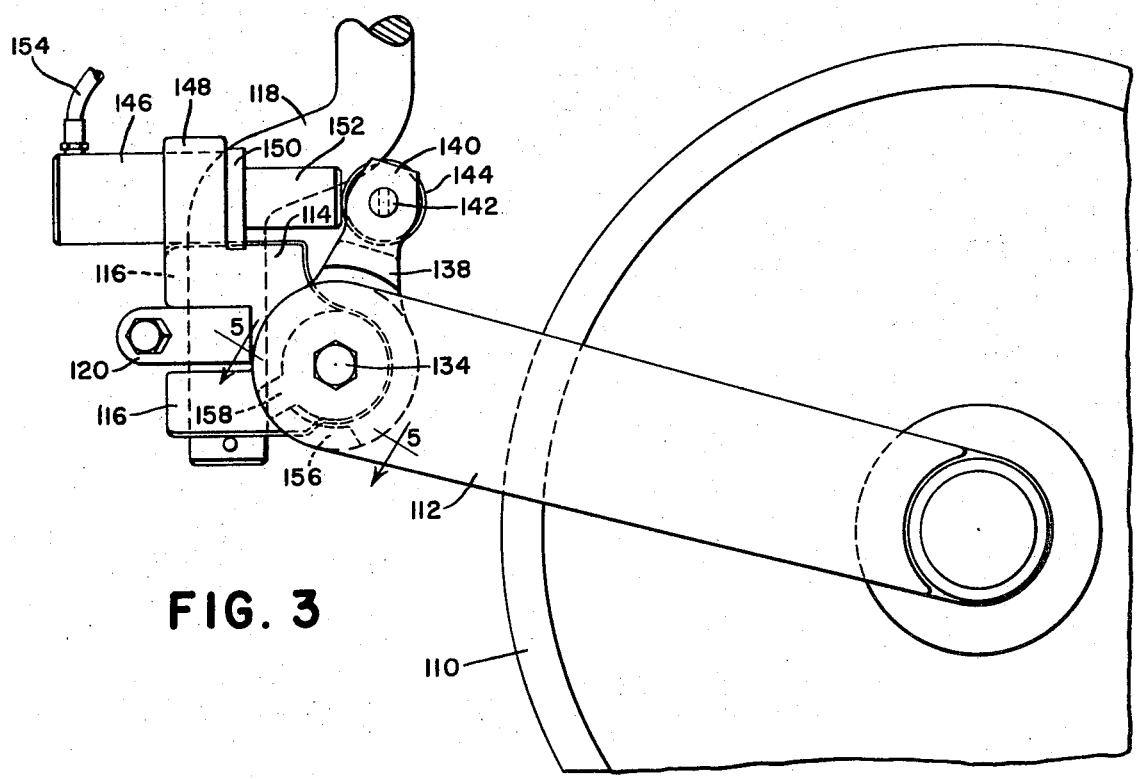
FIG. 3 is a side elevation view of a second embodiment of the invention.
Figure 4:
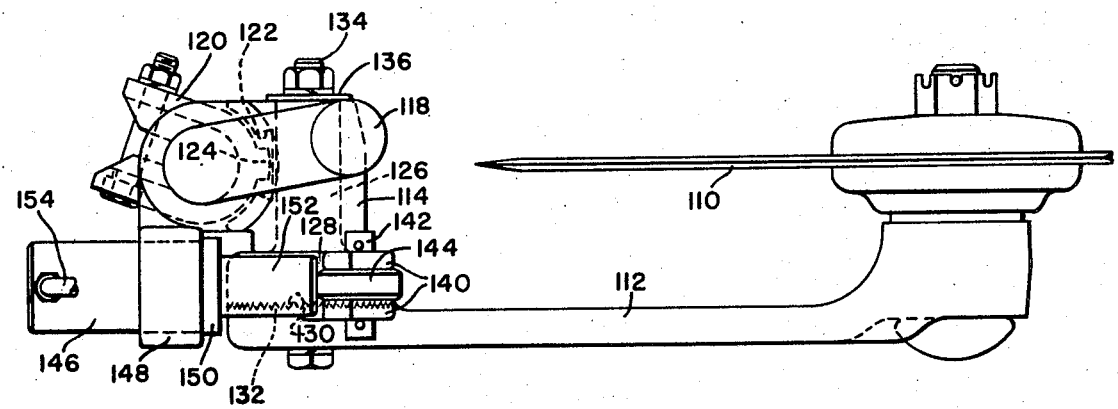
FIG. 4 is a top plan view of the second embodiment of the invention.
Figure 5:
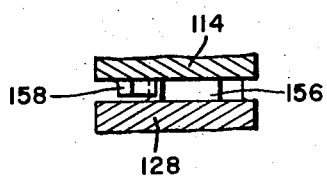
FIG. 5 is a sectional view taken along the lines 5—5 of FIG. 3.

A second embodiment of the invention is illustrated in FIGS. 3-5 of the drawings and basically differs from the first embodiment of the invention in that the spring is replaced by a hydraulic cylinder arrangement. The second embodiment includes a colter 110 rotatably mounted on the rear end of a colter arm 112. The forward end of the colter arm is pivotally connected to a mounting bracket 114. The mounting bracket 114 includes a pair of vertically spaced bearing blocks 116 which are rotatably mounted on the lower end of a shank sides The upper end of the shank is adapted to be clamped to the frame of a plow so that the colter 110 runs in front of the leading edge of one of the bottoms. A clamp 120 is secured to the shank 118 between the vertically spaced bearing blocks 116 to vertically position the mounting bracket on the shank. The main body of the mounting bracket 114 is provided with a recessed area 112 between and rearwardly of the bearing blocks, and a lug 124 on the clamp 120 extends into the recessed area so that engagement between the side of the recessed area and the lug limit rotational movement of the mounting bracket on the shank.

The bracket 114 is provided with a transverse bore in which a rockshaft 126 is rotatably mounted. The rockshaft 126 has an enlarged end 128 which engages the bracket 114 and prevents lateral movement of the rockshaft in one direction. The rockshaft has a through bore and the enlarged end 128 thereof is provided with a circular, laterally directed serrated face 130. The forward end of the colter arm has a centrally apertured and laterally directed circular serrated face 132 complementary to the serrated face on the rockshaft, and a bolt 134 extends through the aperture in the colter arm and through the bore in the rockshaft to clamp the serrated faces together and hold the rockshaft and colter arm in fixed relative positions. A washer 136 on the end of the bolt opposite from the colter arm has a diameter greater than the diameter of the bore in a bracket 114 and engages the bracket to prevent removal of the rockshaft 126.

The enlarged end 28 of the rockshaft 126 has an integral, generally upwardly extending, lever arm 138 which is forked at its upper end to provide a pair of spaced ears 140. The ears 140 are apertured to receive a pin 142 which mounts a roller 144 between the ears 140. A laterally projecting cylinder mount 148 extends to a position to the front of the lever arm 138 and has a large opening which receives a cylinder 146. The cylinder is slid into the opening from the rear and is provided with a radial lip 150 around its open rear end which engages the cylinder mount to properly position the cylinder. A piston or plunger 152 is reciprocally mounted in the cylinder 146 and its projecting end engages the roller 144. A fluid line 154 is connected to the closed forward end of the cylinder 146 and is adapted to be connected to a source of fluid pressure such as an accumulator.

The fluid pressure in the cylinder acts through the plunger 152 to force the lever arm 138 rearwardly and the colter downwardly. However, the rearward movement of the lever arm is limited by and the normal working position of the colter is determined by engagement between lugs 156 and 158 on the enlarged end of the rockshaft and the bracket respectively. If the colter encounters an obstruction, the colter arm can move upwardly by forcing fluid out of the cylinder 146.

The serrated faces 130 and 132 on the rockshaft and the forward end of the colter arm provide the same advantages as in the first embodiment of the invention. Specifically, they provide for the easy adjustment of the working position of the colter with respect to the bracket and also provide the increased clearance needed to avoid damage when an extra large obstruction is encountered.

Due to the unique construction of the colter mounting, many of the parts of the two embodiments are identical and interchangeable. For example, the colter arms and rockshafts for the two embodiments are identical. This has the advantage of lowering manufacturing costs and also make it easier and cheaper to convert from a spring cushion to a hydraulic cushion or vice versa.

Having described two preferred embodiments of the inventions, various modifications within the spirit and scope of the invention will become apparent to those skilled in the art and these obvious modifications can be made without departing from the underlying principles of the invention.

We claim:

1. An adjustable cushion mounting for a colter comprising:

a generally vertical shank; a mounting bracket having vertically spaced journals mounted on the lower end of the shank for rotary movement; a clamp secured to the shank between the journals to retain the bracket on the shank; means acting between the clamp and bracket to limit rotary movement of the bracket on the shank; there being a transverse bore provided in the mounting bracket; a rockshaft rotatably mounted in the bore and having a projecting end; the projecting end of the rockshaft being provided with a serrated face; a generally rearwardly extending colter arm having a colter rotatably mounted on the rear end thereof; one side of the forward end of the colter arm being provided with a centrally apertured serrated face complementary to the serrated face on the rockshaft; bolt means extending through the aperture provided in the forward end of the colter arm and into the rockshaft holding the serrated faces in engagement with the colter arm in an adjusted position with respect to the rockshaft and being deformable in a direction normal to the serrated faces when subjected to an extensive tensile force, whereby the position of the colter arm relative to the rockshaft can be varied by loosening the bolt means; a lever arm provided on the projecting end of the rockshaft; abutment means provided on the mounting bracket in general alignment with the lever arm; yieldable force-applying means acting between the lever arm and abutment means to yieldably rotate the rockshaft in a direction to move the colter downwardly to a normal working position; and stop means acting between the rockshaft and bracket to limit the downward movement of the colter and determine the normal working position of the colter; the parts being so arranged and constructed that the yieldable force-applying means affords upward movement of the colter when the colter encounters an obstruction, and, if the obstruction requires greater clearance than is afforded by the yieldable force-applying means, the bolt means will be deformed to permit the teeth of the serrated faces to slip and thereby prevent damage to the colter.

2. The colter mounting set forth in claim 1 wherein the yieldable force-applying means includes an extensible and retractable hydraulic cylinder means supported by the bracket in engagement with the abutment means and acting against the lever arm on the projecting end of the rockshaft.

3. The colter mounting set forth in claim 1 wherein the yieldable force-applying means includes spring means acting between the abutment and the lever arm on the projecting end of the rockshaft.

4. The colter mounting set forth in claim 1 wherein the lever arm on the projecting end of the rockshaft extends generally upwardly, the abutment means includes an apertured lug on the bracket positioned to the rear of the lever arm, and the yieldable force-applying means includes a tension link having its forward end secured to the lever arm, the tension link extending through the aperture in the lug and having a threaded rear end, retainer means threaded on the rear end of the tension link, and a coil spring encircling the tension link and having its opposite ends bearing against the lug and retainer means, whereby the coil spring normally yieldably holds the lever arm in a rearward position against the lug, and when the colter encounters an obstruction the spring permits forward movement of the lever arm and upward movement of the colter so that the colter clears the obstruction.

5. The colter mounting structure set forth in claim 1 wherein the lever arm secured to the projecting end of the rockshaft extends generally upwardly, and the yieldable force-applying means includes a cylinder carried by the bracket in engagement with the abutment means in a fore-and-aft position forwardly of the lever arm and having an open end facing the lever arm, a plunger reciprocally mounted in the cylinder and having a projecting end in engagement with the lever arm, and means for connecting the cylinder to a source of fluid pressure.

6. An adjustable cushion mounting for a colter comprising: a vertical shank, a bracket having a pair of vertically spaced journals mounted on the lower end of the shank for rotary movement; a clamp secured to the shank between the journals to retain the bracket on the shank; means acting between the clamp and bracket to limit the rotary movement of the bracket; there being a transverse bore provided in the bracket; a rockshaft rotatably mounted in the bore and having one enlarged end which bears against the bracket to prevent lateral movement of the rockshaft in one direction; the enlarged end of the rockshaft having a serrated face; a central bore extending through the rockshaft; a colter arm having a colter mounted on its rear end and a centrally apertured and laterally directed serrated face on its forward end complementary to the serrated face on the rockshaft; bolt means extending through the aperture in the colter arm and the bore in the rockshaft; a washer having a diameter greater than the bore in the bracket mounted on the end of the bolt means opposite from the colter arm to engage the bracket means, whereby, by tightening the bolt means, the rockshaft is secured in the bore in the bracket and the colter arm is retained in an adjusted position relative to the rockshaft; a lever arm on the enlarged end of the rockshaft; abutment means on the bracket; and yieldable force-applying means acting between the lever arm and abutment means to yieldably force the rockshaft and colter arm in one direction to move the colter to and retain the colter in a normal working position; whereby, the yieldable force-applying means affords movement of the colter when the colter encounters an obstruction, and, if the obstruction requires greater clearance than is afforded by the yieldable force-applying means, the bolt means will stretch to permit the teeth of the serrated faces to slip and thereby prevent damage to the colter.

7. An adjustable cushion mounting for a colter comprising: a vertical shank, a bracket having a pair of vertically spaced journals mounted on the lower end of the shank for rotary movement; a clamp secured to the shank between the journals to retain the bracket on the shank; means acting between the clamp and bracket to limit the rotary movement of the bracket; there being a transverse bore provided in the bracket; a rockshaft rotatably mounted in the bore and having one enlarged end which bears against the bracket to prevent lateral movement of the rockshaft in one direction; the enlarged end of the rockshaft having a serrated face; a central bore extending through the rockshaft; a colter arm having a colter mounted on its rear end and a centrally apertured and laterally directed serrated face on its forward end complementary to the serrated face on the rockshaft; bolt means extending through the aperture in the colter arm and the bore in the rockshaft; a washer having a diameter greater than the bore in the bracket mounted on the end of the bolt means opposite from the colter arm to engage the bracket means, whereby, by tightening the bolt means, the rockshaft is secured in the bore in the bracket and the colter arm is retained in an adjusted position relative to the rockshaft; a generally upwardly extending lever arm on the enlarged end of the rockshaft; an apertured lug on the clamp positioned to the rear of the lever arm; a tension link having its forward end secured to the lever arm; the tension link extending through the aperture in the lug and having a threaded rear end; retainer means threaded on the rear end of the tension link; and a coil spring encircling the tension link and having its opposite ends bearing against the lug and retainer means; whereby the coil spring normally yieldably holds the lever arm in a rearward position against the lug; the coil spring yieldably affords forward movement of the lever arm and upward movement of the colter when the colter encounters an obstruction, and, if the obstruction requires greater clearance than is afforded by the coil springs, the bolt means will stretch to permit the teeth of the serrated faces to slip and thereby prevent damage to the colter.

8. An adjustable cushion mounting for a colter comprising: a vertical shank, a bracket having a pair of vertically spaced journals mounted on the lower end of the shank for rotary movement; a clamp secured to the shank between the journals to retain the bracket on the shank; means acting between the clamp and bracket to limit the rotary movement of the bracket; there being a transverse bore provided in the bracket; a rockshaft rotatably mounted in the bore and having one enlarged end which bears against the bracket to prevent lateral movement of the rockshaft in one direction; the enlarged end of the rockshaft having a serrated face; a central bore extending through the rockshaft; a colter arm having a colter mounted on its rear end and a centrally apertured and laterally directed serrated face on its forward end complementary to the serrated face on the rockshaft; bolt means extending through the aperture in the colter arm and the bore in the rockshaft; a washer having a diameter greater than the bore in the bracket mounted on the end of the bolt means opposite from the colter arm to engage the bracket means, whereby, by tightening the bolt means, the rockshaft is secured in the bore in the bracket and the colter arm is retained in an adjusted position relative to the rockshaft; means acting between the rockshaft and bracket to limit rotary movement of the rockshaft in a direction to move the colter downwardly; a generally vertically extending lever arm secured to the enlarged end of the rockshaft; a cylinder secured to the bracket in a fore-and-aft position forwardly of the lever arm and having an open end facing the lever arm; a plunger reciprocally mounted in the cylinder and having a projecting end in engagement with the lever arm; and means for connecting the cylinder to a source of fluid pressure, whereby, the plunger normally retains the lever arm in a rearward position determined by the means acting between the rockshaft and bracket, fluid expelled from the cylinder yieldably affords forward movement of the lever arm and upward movement of the colter when the colter strikes an obstruction, and, if the obstruction requires greater clearance than is afforded by expelling the fluid from the cylinder, the bolt means will stretch to permit the teeth of the serrated faces to slip and thereby prevent damage to the colter.

\* \* \* \* \*